United States Patent Office.

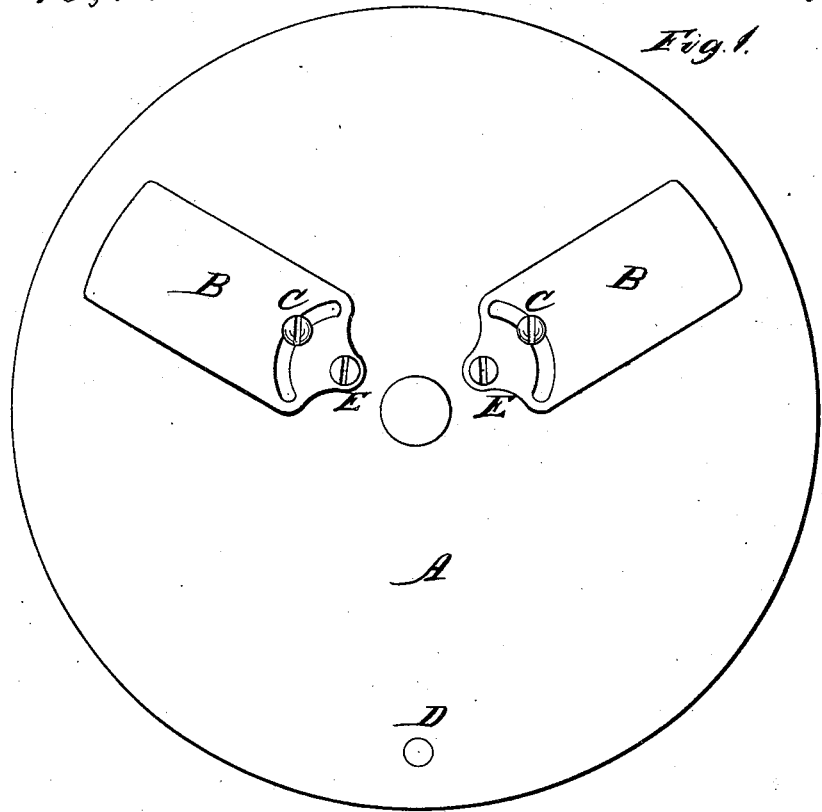

HORACE K. JONES, OF KENSINGTON, CONNECTICUT.

Letters Patent No. 79,475, dated June 30, 1868.

---

IMPROVEMENT IN BALANCING POLISHING-WHEELS.

---

*The Schedule referred to in these Letters Patent and making part of the same.*

---

TO ALL WHOM IT MAY CONCERN:

Be it known that I, HORACE K. JONES, of Kensington, in the county of Hartford, and State of Connecticut, have invented a new and improved Method of Balancing Polishing-Wheels; and I do hereby declare that the following is a full, clear, and exact description thereof, which will enable others skilled in the art to make and use the same, reference being had to the accompanying drawing, forming part of this specification, in which—

Figure 1 is an elevation, showing a wheel with the balancing-weights attached.

Figure 2 is a plan of the same.

Figure 3 is a plan of the weight B.

Figure 4 is a longitudinal section of the same.

Similar letters of reference indicate like parts.

This invention consists in the use, for the purpose of balancing polishing-wheels, of two or more weights, attached to the side of the wheel in such a manner that each may swing upon a pivot, fixed at a convenient distance between the axis and circumference of the wheel to which each is attached by a screw, by which it may be firmly fixed in any desired position within the limit of its motion; also, in attaching, when necessary, a fixed weight to the side of the wheel, at a point opposite the movable ones. When from any cause the wheel becomes heavier upon one side of its axis than upon the other, the movable weights can be moved towards the light side until the wheel is perfectly balanced.

B represents a weight, made of flat rolled iron or other suitable material, with a hole at one end for the reception of the screw E, and containing a slot, curved so that it is at all parts at an equal distance from the centre of the hole at the end.

C is a screw, passing through the curved slot in the weight B, into the wheel A.

E is another screw, passing through the hole in the end of the weight B, into the wheel A, and forming the pivot upon which the weight swings.

D is a weight, fixed in the side of the wheel to counterbalance the movable weights B B.

The weights B B having been attached to the side of the wheel A by the screws C and E, and radiating from the centre of the wheel about one hundred and twenty degrees apart, the weight D, of iron or other substance, is inserted in the side of the wheel, to counterbalance the weights B B; or instead of this, there may be three or more of the weights B, fixed at equal distances around the axis of the wheel. It frequently occurs that the wheel, when made, is sufficiently heavy on one side of the axis to counterbalance the weights B B, in which case no weight D is required

Operation.

Whenever the wheel A, thus provided with movable weights, from any cause loses its equilibrium, it is put on a mandrel, which is placed upon parallel horizontal ways, and, the heavy part settling at the bottom, the weights B B may be moved till the equilibrium is restored, when the wheel will be ready for use.

Claims.

I claim as new, and desire to secure by Letters Patent—

1. The use, for the purpose of balancing wheels, of two or more weights, swinging upon pivots located between the axis and periphery, and capable of being fixed at any point upon the side of the wheels, within the limit of their motion, by a screw or other suitable means.

2. The combination of the movable weights B B with the fixed weight D for the purpose specified.

HORACE K. JONES.

Witnesses:
   J. H. WOODWARD,
   FANNY HOTCHKISS.